Nov. 26, 1957  D. R. MILLS  2,814,443
SHAFT POSITION INDICATOR
Filed Dec. 27, 1955  6 Sheets-Sheet 1

HUNDREDS READOUT    TENS READOUT    UNITS READOUT

INVENTOR.
DONALD R. MILLS
BY
AGENT

Nov. 26, 1957 — D. R. MILLS — 2,814,443
SHAFT POSITION INDICATOR
Filed Dec. 27, 1955 — 6 Sheets-Sheet 4

Nov. 26, 1957

D. R. MILLS 2,814,443

SHAFT POSITION INDICATOR

Filed Dec. 27, 1955

Nov. 26, 1957     D. R. MILLS     2,814,443

SHAFT POSITION INDICATOR

Filed Dec. 27, 1955     6 Sheets-Sheet 6

United States Patent Office 2,814,443
Patented Nov. 26, 1957

2,814,443

SHAFT POSITION INDICATOR

Donald R. Mills, Buckingham, Pa., assignor to International Business Machines Corporation, New York, N. Y., a corporation of New York Application December 27, 1955, Serial No. 555,652

18 Claims. (Cl. 235—92)

This invention relates to a counter mechanism for shaft position indicating or recording devices. More particularly, it relates to a counter having mechanical drive and electrical readout comprising a number of individual counters geared together, with speed reduction between counters corresponding to the system of a notation used. A portion of this invention is shown and described in Donald R. Daykin application, Serial No. 367,948, filed July 14, 1953, and assigned to the assignee of the present application.

Geared counters of the type referred to have certain known advantages, such as freedom from sudden torque loads at time of carry; ability to retain correct position even if power is switched on or off; ability to rotate forward or backward and thus to add or subtract; and so forth.

They present a problem, however, in reading out their position because of ambiguity at the breaks between adjacent digit positions. If, for example, an ordinary brush and commutator type of readout is used, the brush may make contact with segments pertaining to two adjacent digits at the same time.

The disclosed geared counters are electro-mechanical devices for translating a shaft position or the like into electrical signals. They can be used to convert any data which is expressed as a shaft position such as lead screw position or motor-driven servo-system output or the like into a form usable by automatic data handling equipment such as a display panel, card punch, a tape punch, or a digital computer.

The above-mentioned frequently encountered requirements of low input torque, high input shaft speed, and completely nonambiguous electrical readout are met by these counters. In addition, the improved counters have other advantages over alternative systems. For example: small size; no accelerated motion at the time of carry; no high precision parts are required; low wear at high speeds because the cam followers can be lifted off of the cams and the only moving parts are shafts, bearings and gears; the unit cannot "lose" the count because the numbers are built into the mechanical structure and do not depend upon any external memory. Thus the input shaft can be rotated at any speed in either direction and the power switched on and off without losing track of the inherent relationship between shaft position and readout value.

Each geared counter consists of a group of decade units capable of subdividing one shaft revolution into ten parts. Connecting the decade units together are ten-to-one gear trains so arranged that the second decade moves at one-tenth speed of the input decade, the third decade moves at one-tenth the speed of the second and so on. Thus the first decade indicates tenths of revolutions, the second indicates whole revolutions, and the third indicates tens of revolutions. However, for simplicity of the following description, the lowest decade will be termed the "units" decade, the second decade, the "tens" and the third decade, the "hundreds" decade. This can be extended to as many decades as is desired. All of the decades, except the first, in each counter group are alike and may be interchanged or assembled into groups of any size.

In order to determine which number to read out, the decades use two types of information, the first being generated internally by a group of cam operated contacts. The cams are so arranged that it is possible at any position of the shaft to complete electrical circuits indicating the correct readout signal with the possibility of also completing a circuit corresponding to the closest adjacent position. To select which cam circuit to read through, the decade unit makes use of a second piece of information which it obtains from the next lower order and higher speed decade. The first or units decade having no lower order decade to control it generates this selecting signal internally.

Thus the actual change of numbers for any decade is controlled by relays and electrical signals which refer back through the lower ordered decades eventually to the units decade in every case. Because of this electrical carry feature, the exact positions where the cams make and break their circuits are not important; readout circuits are preferably never passing through the cam contacts at the time of their makes and breaks. The only requirements on cam timing are that the proper cam contact always be made during the time when the readout circuit is passing through and that it never be made more than 18° from the point where it is last used. This means that the cam timing has a maximum tolerance of plus or minus 9°, with the exception of two cams in the lowest order decade.

A primary object of my invention is, accordingly, to provide a counter of the type described in which there is no possibility of ambiguity in the readout.

Another object is to provide a counter of the type described requiring no high precision parts and having low wear.

Another object is to provide a counter of the kind referred to occupying a small space.

Still another object is to provide a counter having overlapping contact operating cams which are selectively gated to indicate true shaft position.

It is yet another object of the invention to provide a counter responsive to shaft positions which has a minimum number of contact operating cams and gating relays.

Still another object is to provide such a counter adapted to be made up in any desired capacity by assembling together similar units.

It is another object of the invention to provide a counter which is capable of providing a negative readout.

Other objects of the invention will be pointed out in the following description and claims and illustrated in the accompanying drawings, which disclose, by way of examples, the principle of the invention and the best mode, which has been contemplated, of applying that principle.

Figure 9:
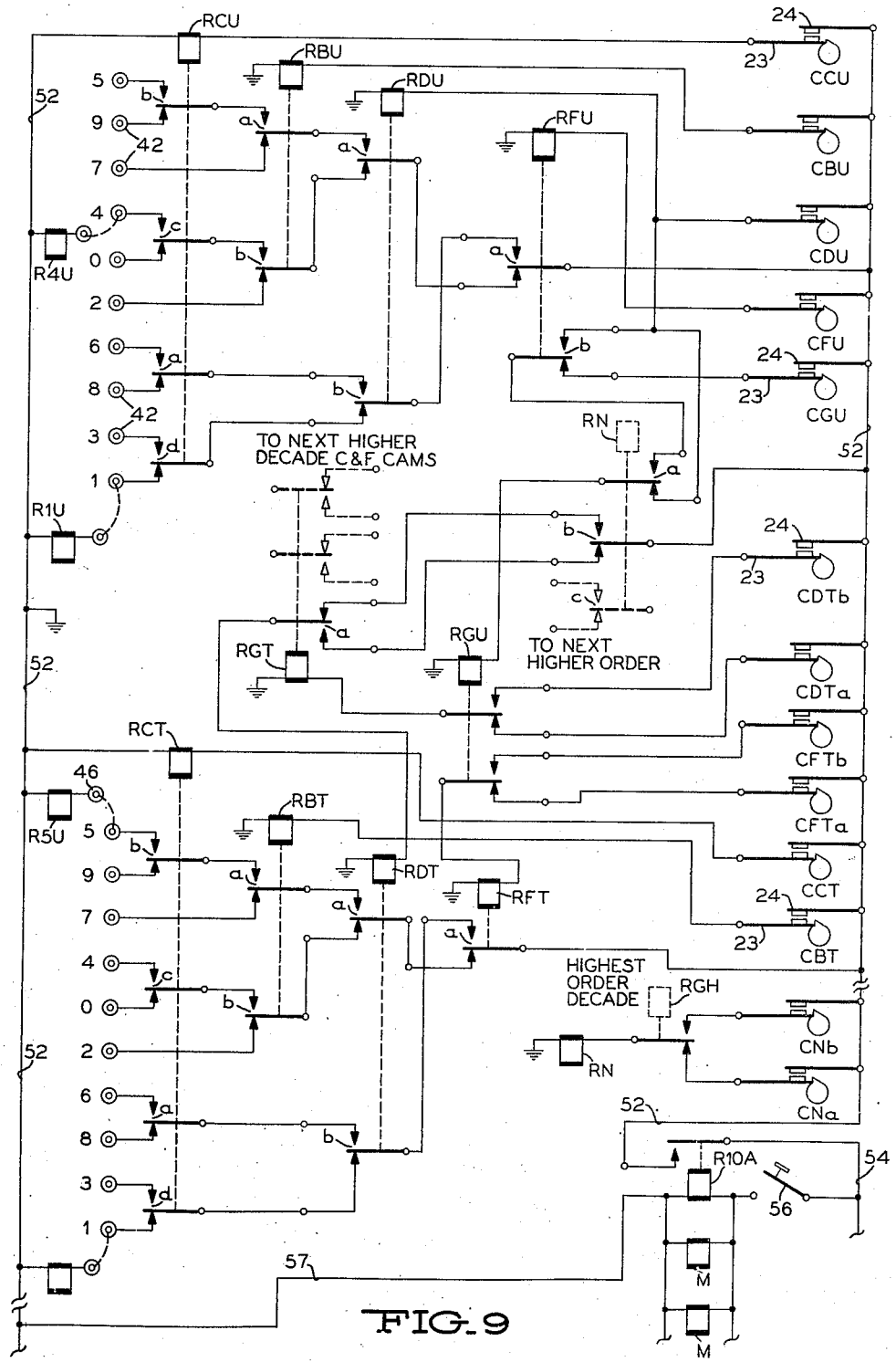
Fig. 9 is a modified partial circuit diagram of a lowest and next higher order counter conforming to Fig. 10 to provide both positive and negative readout.
Figure 12:
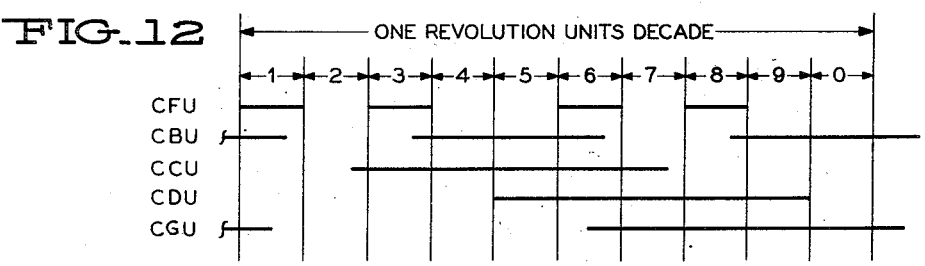
Figure 13:
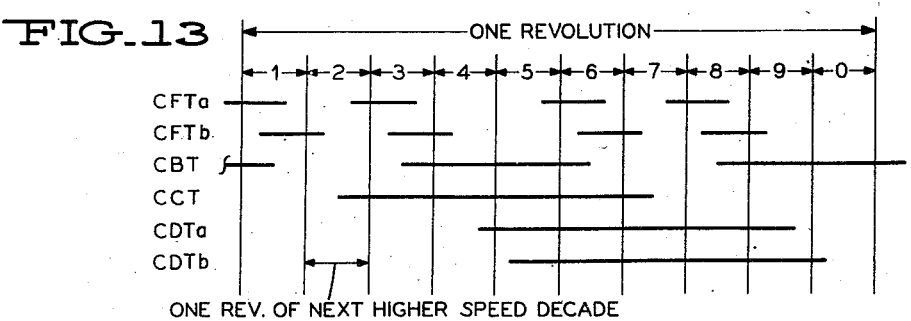

Figs. 12 and 13, respectively, are similar cam timing diagrams of the modification shown in Fig. 9.

The invention will be explained by reference to an illustrative embodiment employing relay switching means. Such a counter can be used where readout takes place intermittently with the shaft stationary. By a slight change in the circuit, it can be made to read out continuously at moderate shaft speeds, say up to 240 R. P. M. By the use of electronic switching means, continuous readout can be handled with considerably higher shaft speeds. The time limitations are imposed by the time required for the ripple-type carry controls which will be described later.

The illustrative embodiments of the invention shown in the drawings are multi-order counters, each order of which is a separate unit. The counters are assembled by setting up side by side as many units as are required for the desired capacity. All of the single order counters, except the lowest order, are the same. In general, the lowest order counter resembles the other related counters but has certain differences which will be pointed out. Throughout the description like elements are given like reference characters.

Lowest order counter

Figure 1:
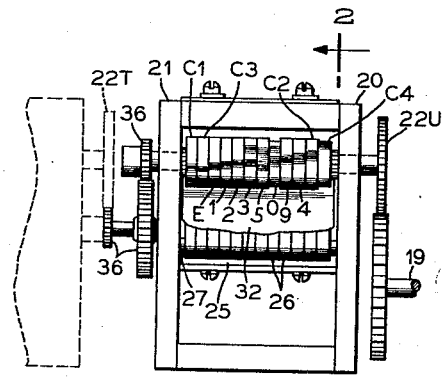
Fig. 1 is a longitudinal vertical sectional view parallel to the shaft, of a single denominational order counter embodying my invention showing its relation to an adjacent counter and is taken approximately on the line 1—1 of Fig. 2.
Figure 2:
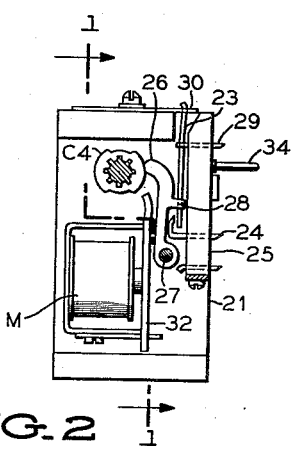
Fig. 2 is a transverse vertical sectional view taken approximately on the line 2—2 of Fig. 1.

The mechanical features of the single order counters, as seen in Figs. 1 and 2, are the same for all orders. Due to certain differences in reference numbers, the counter shown in these figures will be described as a lowest order counter. It comprises a box-like frame made up of moldings of plastic insulating material. Across two side walls 20 and 21 of the frame extends a units shaft 22U, which is driven by a shaft 19 whose angular position is to be indicated. The counter shown being designed for the decimal scale, shaft 22U, has a series of twelve cams keyed upon it, respectively identified as C1, C3, E, 1, 2, 3, 5, 0, 9, 4, C2 and C4. For each cam there is a contact consisting of a flexible wire 23 and a stationary wire 24 rigid in the back wall 25. For each flexible contact wire 23, there is a contact operating lever 26 rockably mounted upon a stationary shaft 27 extending between the side plates 20 and 21. The contact operating lever has a slotted boss 28 through which the flexible wire contact 23 is threaded. The wire is also threaded through holes in a stationary insert 29 and an adjustable plate 30, the adjustment of the latter being such as to impart a bow to the wire, tending to rock the contact operating lever 26 counterclockwise as shown in Fig. 2.

The contact operating levers 26 bear upon the respective cams C1 to C4, under the pressure of their related contact wires 23. However, a retracting bail 32, extending across all of the contact operating levers and which is normally urged toward the right in Fig. 2 by a spring, not shown, holds the contact operating levers clear of the cams, when in its normal position. The retracting bail 32 is shown in the position it assumes when attracted by a readout magnet M. In this position of the retracting bail 32, it is clear of the contact operating levers 26, which rest upon their respective cams. Depending upon whether a contact operating lever 26 rests upon a high dwell or a low dwell of its cam, the contact wire 23 will touch, or will not touch, the related stationary contact 24. With the above arrangement, frictional torque and wear are reduced considerably.

The counter unit is adapted to be mounted upon a panel, not shown, by means of a pin 34, and also by the extending ends of the inserts 24 and 29, which are adapted to be received in contact socket members on the panel. The latter contact members provided circuit connection to the wire and stationary contact elements 23 and 24.

Figure 3:
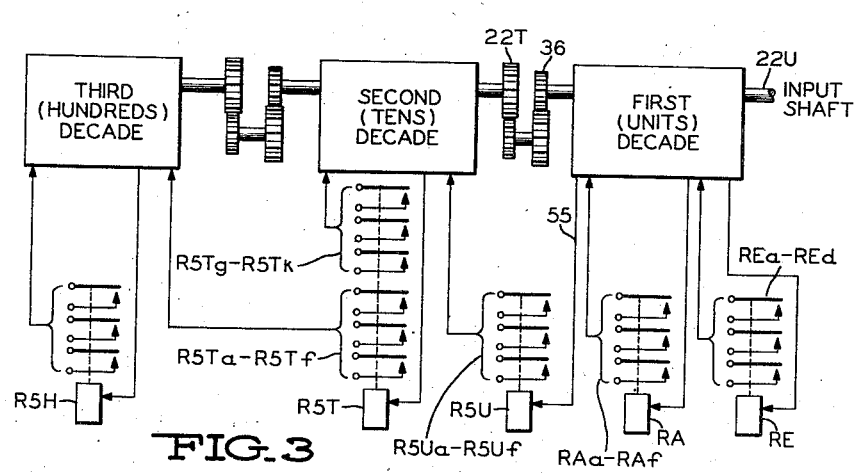
Fig. 3 is a diagrammatic view of a 3-denomination counter embodying my invention.

At the left side of the counter in Fig. 1, there is a ten-to-one reduction gear 36 for connecting the units cam shaft 22U to the tens shaft 22T of the next higher order counter shown in dotted lines. The interconnection of three single order counters to make a 3-denomination counter is shown in Fig. 3. Thus each decade unit has the necessary ten-to-one gear reduction formed as an integral part.

Figure 6:
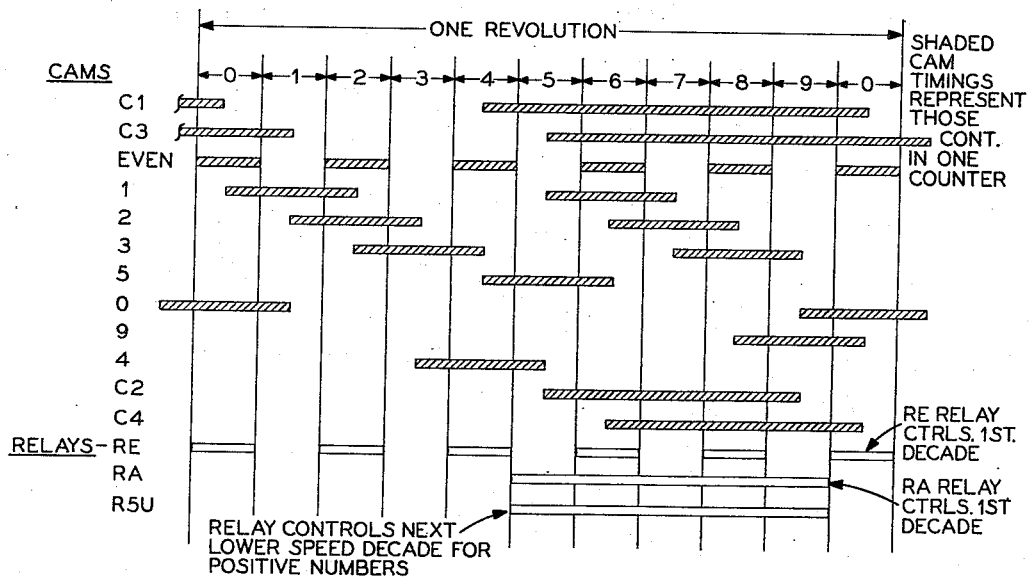
Figs. 6 and 7 are timing diagrams of the lowest and next higher order counters, respectively, as shown in Fig. 5.
Figure 5:
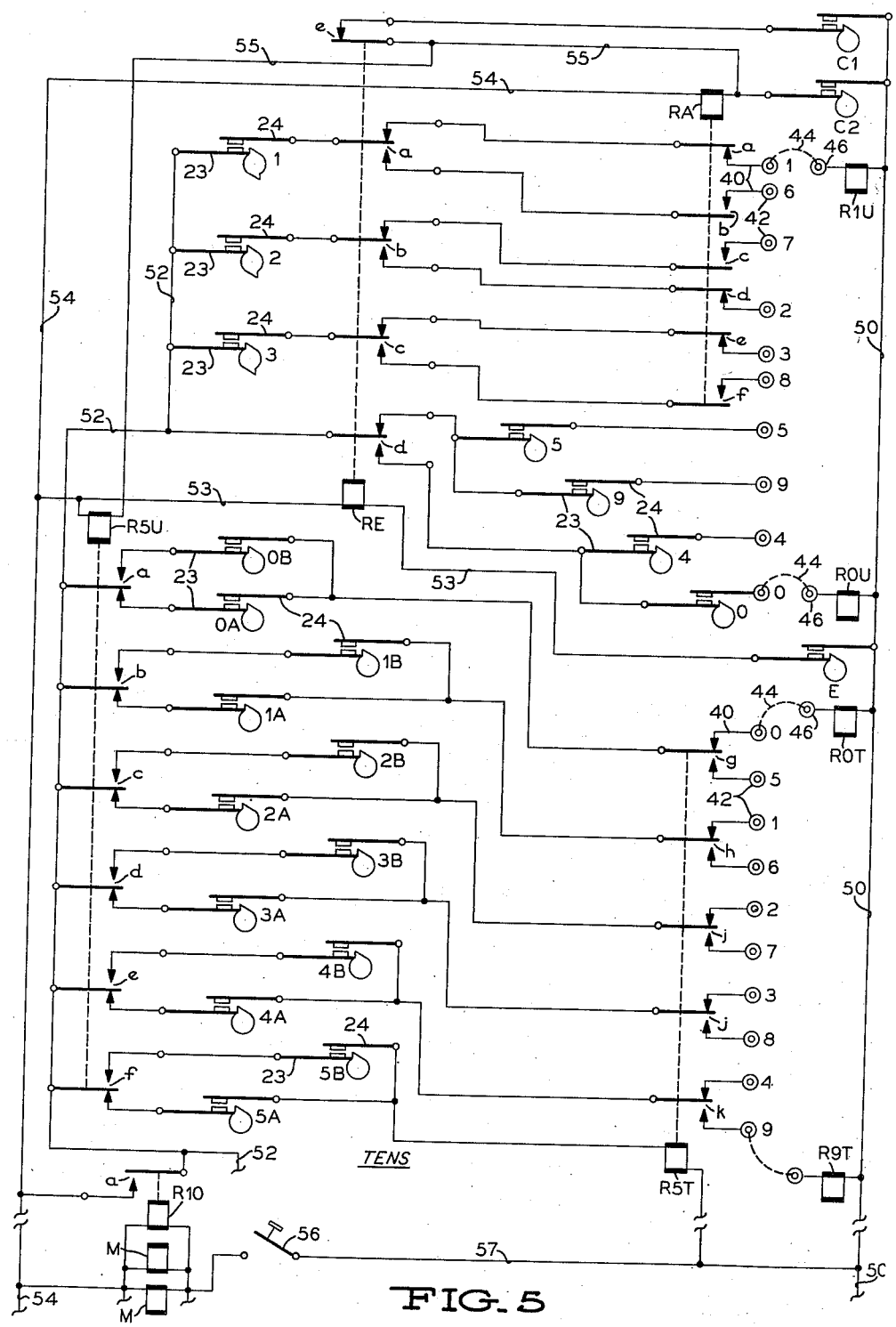
Fig. 5 is a partial circuit diagram of a lowest order counter and the next higher order counter conforming to Figs. 1 to 3.

The configuration of the units cams is indicated by the timing diagram, Fig. 6. There are seven units digit cams 1, 2, 3, 5, 0, 9, 4, which operate digit contacts 23, 24, identified in the upper portion of the wiring diagram, Fig. 5, by the same numbers. There are also shown in Fig. 5 portions of the ten units digit readout circuits, represented by wires 40 and terminals 42, the digits to which the respective circuits pertain being shown by the numbers at the right side of each terminal. By way of example, the terminals 42 may be connected, as shown for the "0" terminal, by plug wires 44, to respective plug hubs 46, from which a circuit runs through a relay, such as ROU to the positive line 50. There may be, for example, ten relays such as ROU, one for each order of the counter, to control respective circuits, not shown, to lamp banks or the like on which the digits read out of the counter shaft 22U are displayed. A typical circuit will be traced presently.

A common wire 52 is connected directly to one terminal of each of the digit cam contacts 1, 2, and 3, also to the swinger or common terminal of contacts REd of a relay RE. This relay is called the "even" relay because it is energized for even digits, by a conductor 53 controlled by the cam contact E, which closes when the shaft 22U is in an even digit position at the time the readout magnet M is energized. The cam contact E remains open when the shaft is in an odd digit position, see Fig. 6. In the normal position of contacts REd, a circuit is prepared to the digit cam contacts 5 and 9, while in the transferred position of contacts REd, a circuit is prepared to digit cam contacts 4 and 0.

The units digit circuits 1, 6, 7, 2, 3 and 8, controlled by the digit cam contacts 1, 2 and 3, are additionally controlled by the relay RE at the transfer contacts REa, REb, and REc, and by contacts RAa to RAf of a relay RA. This latter relay is energized by the cam contacts C1 and C2 whenever, at the time the magnet M is operated, the shaft is in a digit position from 5 through 9, as will be evident from an examination of its circuits in Fig. 5 and the timing diagram, Fig. 6. Cams 1, 2 and 3 are double lobed and close their contacts not only in positions 1, 2 and 3 of shaft 22U, but also in positions 6, 7 and 8, respectively.

The common wire 52 can be connected to the negative wire 54 by contacts R10a of a relay R10. This relay has a delayed action, as indicated, for a reason to be explained.

The operation of the lowest order counter will now be explained, with particular reference to the upper portion of Fig. 5. The shaft 22U, Figs. 1 and 2, driven by some shaft whose position is to be indicated, has been turning freely, with the read out magnet M deenergized and the cam operating levers 26 held out of contact with the cams on shaft 22U by the retracting bail 32. As a readout switch 56 is closed, Fig. 5, in a line 57, a circuit is completed from line 50 through the magnet M to line 54 to energize the same. When this occurs, the retracting bail 32 swings to the left, Fig. 2, and the contact operating levers 26 come to rest on all of the cams C1–C4. There is one magnet M for each decade. Any automatic switching means may replace the manual switch 56.

If the shaft 22U is in the "0" position, cam contact E and digit contact 0 will close, Figs. 5 and 6. The relay RE is energized and all of its contacts REa and REd transfer.

The closure of switch 56 also completes a circuit through relay R10, but this relay is slugged and picks up after magnet M and relay RE have been energized. When contact R10a closes, a circuit is completed from line 54 through R10a, wire 52, REd transferred, the 0 digit cam contact, the 0 wire 40 and terminal 42, plug wire 44, terminal 46, relay ROU to wire 50, energizing said relay. Relay ROU may control any means, such as a lamp bank or any recording means, to indicate or record a zero.

The digit contact 1 may also be closed when the shaft is in position "0," but with REa transferred, there is no circuit to terminal 1. Likewise, there is no circuit to terminal 6 because of open contact RAb. The digit cam contact 9 may be closed when the shaft is in another part of position "0," but with REd transferred, there is no circuit to terminal 9.

If the shaft 22U is in the "1" position when readout switch 56 is closed, digit contact 1 will be closed. When contact R10a closes, a circuit will be completed from wire 54 through R10a, wire 52, digit contact 1, REa, normal, normally closed contact RAa, the 1 digit wire 40 and terminal 42, thence through the plug wire 44 to energize a relay R1U representing the units value 1.

When the shaft 22U crosses over to position 2, digit contact 1 may still be closed when the test signal is sent through R10a, but now cam contact E will be closed and relay RE energized. The circuit to terminal 1 will be open at contact REa, but the circuit to terminal 2 will be closed at contacts REb and RAd.

Examination of the branch circuits for each of the other digit positions of the shaft will show that in every case the circuit is closed to one and only one of the terminals 42. The break is made, not by the digit contacts themselves, but by the contacts of the relay RE. Since this relay must be in one condition or the other, there is no ambiguity in the indication of the shaft position.

Cam contact C1 is closed for digit 5 to 9 time and causes relays RA and R5U to be energized during this time. Cam contact C2 is closed for digit 6 to 8 time and provides an auxiliary holding means over the lines 55 for the relays RA and R5U during digit time when the contact REe is opened by the relay RE. The cams C3 and C4 shown structurally in Figs. 1 and 2 and diagrammatically in Fig. 6 are provided for negative or reverse operation of the counter. Since negative or reverse operation is to be described with respect to the modification shown in Fig. 9, for simplicity, these circuits have been deleted from the units counter of the wiring diagram in Fig. 5.

*Higher order counters*

As previously stated, the higher order counters are driven through reduction gearing from the shafts of their respective adjacent lower order counters. In the lowest order counter the switching action to differentiate adjacent shaft positions was generated internally within the lowest order counter. In each higher order counter this switching action is generated within the next lower order counter and so the chain of control traces back to the lowest order counter.

In the second order counter the digital switching control is performed by contacts of the relay R5U, which is connected in parallel with relay RA. These relays are de-energized for shaft positions 0 through 4 of the lowest order counter and energized for positions 5 through 9. Because of the ten-to-one gear reduction between shaft 22U and shaft 22T, relay R5U is de-energized for the first half of each digital position of the shaft 22T and energized for the second half of each digital position in contrast to the relay RE, which is energized for the even digital positions of shaft 22U and de-energized for the odd digital positions.

In the second order counter the break between each digital position and the next higher one is always indicated by a shift of the switching means (contacts of relay R5U) in the same direction, namely, from transferred to normal position. This calls for a different arrangement of digit cams and digit circuits, which will now be described.

Figure 7:
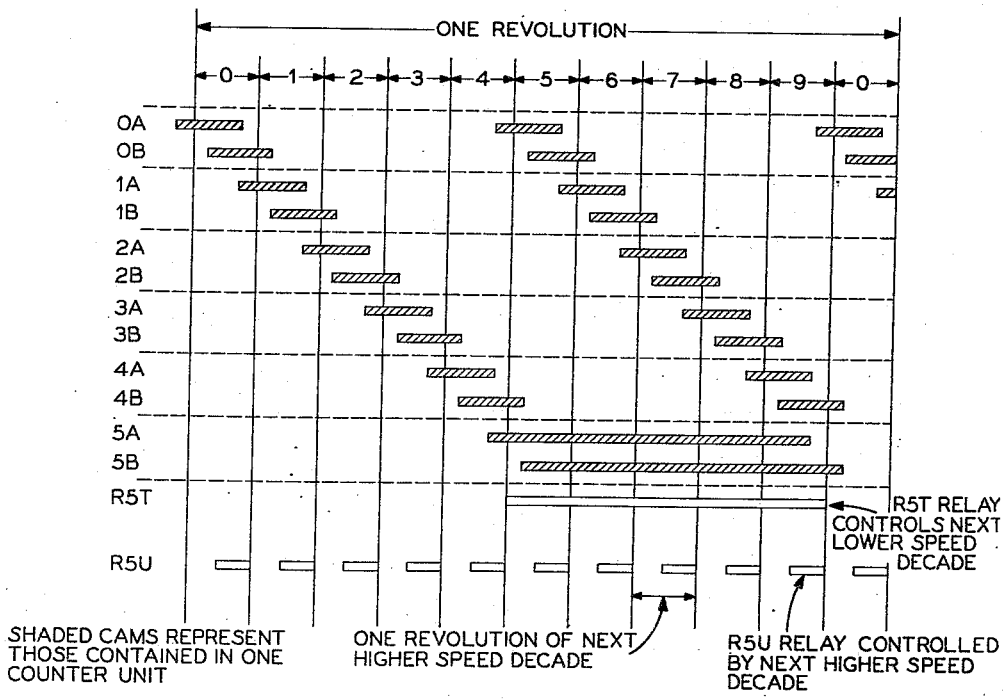

For each digital position 0 through 4 of the shaft 22T, there are two double lobed cams, represented in the timing diagram, Fig. 7, as 0A, 0B; 1A, 1B; 2A, 2B; 3A, 3B; and 4A, 4B. The second lobes of these cams pertain to the digits 5 through 9, respectively.

Referring now to the lower portion of the wiring diagram, Fig. 5, the digit cam contacts 1A and 1B, for example, are respectively in two parallel circuits controlled by the relay contacts R5Ub. With the latter contacts in normal position, the 1 digit circuit extends through contact 1A and with R5Ub transferred, the circuit extends through 1B. When the tens shaft 22T moves from "0" position into "1" position, cam contacts 0B and 1A are both closed. The break between the two digit positions of the shaft is decided by the opening of the normally open contacts R5Ua and the closing of the normally closed contacts R5Ub.

The contacts of relay R5U move to the transferred position at the mid-point of each digital position of the shaft 22T. At this time both the A and the B digit contacts of the selected combination are closed so the transfer has no effect.

Another pair of cam contacts, 5A and 5B, control parallel branches of a circuit leading through a relay coil R5T. Transfer contacts R5Uf cooperate with contacts 5A and 5B to complete a circuit to relay R5T in all digit positions 5 through 9 of shaft 22T and to hold this circuit open in the digit positions 0 through 4. The relay R5T has two functions. Its contacts R5Tg to R5Tk control the switching of the digit circuits from the terminals 0 through 4 to the terminals 5 through 9, respectively, in the tens counter. Its contacts R5Ta to R5Tf, Fig. 3, have the same function in the hundreds counter as the contacts R5Ua to R5Uf have in the tens counter.

The circuit of each higher order counter is the same as that of the second order counter just described. In the highest order position the relay, such as R5H, Fig. 3, corresponding to the relay R5T, will have no contacts to control the switching in a higher order.

Now assuming the units decade has made exactly 3.9 revolutions, the units 9 terminal 42 is energized, as previously described, through contact REd normal and closed cam contact 9. At the same time the R5U relay is energized from the cam C1 and contact REe, normal, to energize the tens 3 terminal through the contact R5Ud transferred, and closed cam contact 3B. As the units decade passes from 9 to 0, the even relay RE closes and transfers the contact REd to open the digit 9 circuit and now read out over the digit 0 terminal through the closed cam contact 0. With transfer of the relay RE, the contact REe opens and the relay R5U returns to normal to thereby open the tens digit 3 circuit. This transfer to normal energizes the tens digit 4 terminal through the contact R5Ue normal, and now closed contact 4A. Thus a 4.0 may be read out of the counter.

By the time the even relay RE is de-energized at the end of digit 0 time, both cam contacts C1 and C2 are open, therefore, the relay R5U stays normal and will so remain from 0 through 5 of the units decade rotation. With continued shaft rotation, cam C1 closes at the latter portion of the "4" position, and as the units decade reaches its "5" position, the relay R5U is energized to transfer its releated contacts. This transfer, of course, still maintains the readout over the tens 4 terminal through the now transferred contact R5Ue and closed cam contact 4B. Thus a 4.5 may be read out from the counter. As previously mentioned, the relay R5U remains transferred from 5 through 9 of the units decade.

Now as the transfer occurs from 49 to 50, the operation is identical to that from 9 to 0 for the units decade and the shift from the 4 to the 5 digit terminal in the tens decade is accomplished at two locations. As the relay R5U returns to normal upon energization of the relay RE at 0 time, the previously closed cam contacts 5A and 0A, connected to the contacts R5U*f* and R5U*a*, respectively, complete their respective circuits to the relay R5T and the digit tens 5 terminal, the latter taking place through the transferred contacts R5T*g*. Thus a 5 is read out of the tens decade and will continue to do so during the next entire revolution of the units decade.

It is to be noted that the relay R5T remains energized during the entire time the tens decade is between 5 and 0, regardless of the condition of the relay R5U. Of course, operation of the relay R5T causes transfer of the relay points or contacts R5T*a* to R5T*f* in the hundreds decade, Fig. 3, similar to the relay R5U points in the tens decade to cause a similar readout but includes the hundreds position. Any suitable number of decades may be added which will be identical to the tens decade.

In view of the above it can be seen that for any position of the units decade, a positive readout is obtained over the appropriate units terminal and that a readout is provided over the tens and hundreds decades which is a direct function of the rotation of the units decade. While the improved counter may have overlapping cams and operating sections, accurate readout is accomplished by the opening and closing of single cam contacts at predetermined points in the shaft rotation.

Figure 8:
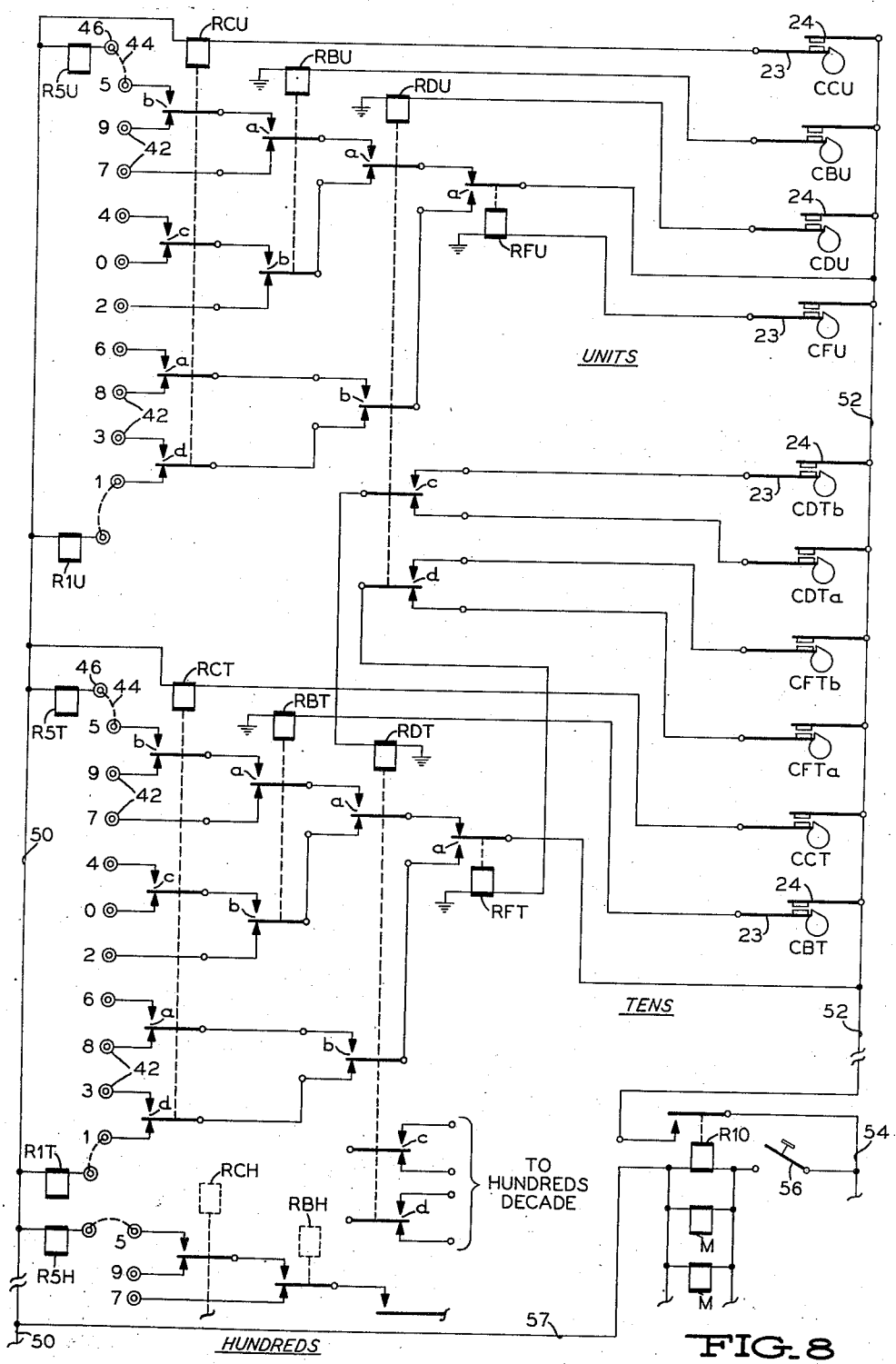
Fig. 8 is a modified partial circuit diagram for a lowest and next higher order counter which incorporates a smaller number of cam contacts.

Referring now to Fig. 8, there is shown a modified units and tens counter for positive numbers which is similar in operation to that disclosed in Fig. 5. However, in this instance the number of cams required for positive number readout has been reduced from 10 to 4 in the units decade and from 12 to 6 in the tens and any subsequent or higher decade. In addition, all decades are provided with identical relay trees or networks for reading out the shaft position. While the particular cam timing has been modified somewhat, the identical structures as shown in Figs. 1 and 2 would be applicable.

As previously noted, each lower order decade tells the next adjacent higher order unit whenever it goes from 9 to 0. The number changing of the controlled decade is arranged to coincide with the 9 to 0 signal from the controlling decade. Thus if the input shaft is in the 599 position and is turned toward the 600 position, the first thing that happens is the transfer of the units decade readout from 9 to 0. The signal produced by this change causes the tens decade to change from 9 to 0, which in turn causes the hundreds decade to change from 5 to 6. If the shaft is now turned back, the same progression of number changes, initiated by the units decade, occurs in reverse. This process is independent of a reasonable amount of backlash in the gears and if the movement of the input shaft takes place over a small angle near the 9 to 0 point, the shafts in the tens and hundreds decades may not move at all and still provide an accurate readout.

Because the first decade has no lower order or higher speed decade from which to obtain its 9 to 0 information, it is different from the rest of the units and will be described first. The expression "timing" will refer to circuit condition versus shaft angle and will have no relation to actual time in the ordinary sense.

For positive numbers, the units decade comprises four cams, having related cam contacts CCU, CBU, CDU, and CFU, all of which are rotated in unison by the shaft 22U. Each contact directly controls related relays RCU, RBU, RDU, and RFU, respectively. As previously described, the output side of the units decade includes gearing 36 to provide a ten-to-one gear reduction to the tens decade.

Figure 10:
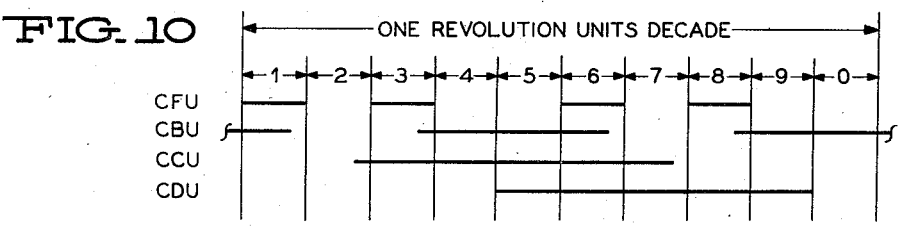
Figs. 10 and 11 are cam timing diagrams of the modified units and next higher order counters, respectively, shown in Fig. 8.

As before, the units and other decades have their respective shaft rotations divided into ten sections, each involving a digit indication for each 36° of shaft position. Referring to Fig. 10, the actuation of the units cams is shown for one complete shaft revolution. It is to be noted that the definition point between any two adjacent numbers is defined by the change of one cam only. Thus cam contact CFU is closed at the 1, 3, 6 and 8 positions of the shaft, cam contact CDU is closed from 5 to 9, inclusive, cam contact CBU closes during the latter portion of the 3 and 8 shaft positions, and opens toward the end of the 6 and 1 positions, respectively, and cam contact CCU closes toward the end of the 2 position and opens during the latter portion of the 7 position.

As shown in Fig. 8, each of the units cams is capable of completing circuits from the line 52 through their respective stationary and movable contacts 24 and 23 to a related coil of a relay winding. Thus a ten wire readout is achieved through a relay tree network made up of various points on the four relays. For purposes of simplicity and an easier understanding of the drawings, the opposite side of most of the relay coils is shown as being connected to ground. The left-hand portion of the drawing indicates a plurality of terminals 42 which have digit values assigned as indicated. Each terminal 42 includes the usual plug wire 44 connected to a related terminal 46 leading to a related readout magnet. In this instance, only the readout units magnets R5U and R1U are disclosed. However, it is to be understood that each digit readout terminal would be provided with an identical arrangement.

With respect to the units readout, it can be readily seen from Fig. 10 that if the shaft is in its "0" position, cam contact CBU is closed which, assuming relay R10 is energized, will energize relay RBU to transfer relay contacts RBU*a* and RBU*b*. Thus the 0 terminal is energized from line 52 through contacts RCU*c* normal, RBU*b* transferred, RDU*a* normal, and RFU*a* normal. As the shaft is rotated through its "0" position, the cam contact CBU still remains closed, however, as the "1" position cam contact CFU closes. Closure of this contact energizes the relay RFU and transfers its related contact RFU*a*. Transfer of this latter contact opens the circuit to the 0 terminal, even though the relay RBU is energized. The energization of relay RFU completes the circuit to the R1U readout coil from the line 52 through the contacts RFU*a* transferred, RDU*b* normal, RCU*d* normal, to the 1 terminal and through relay R1U to the line 50.

For another example consider the change from a digit 3 to a digit 4. A 3 is read out through the tree network when cam contacts CFU and CCU are closed and relays RFU and RCU are picked. As the digit 4 position is approached, cam contact CBU will close, picking relay RBU. This, however, will have no effect on the 3 which is being read out through the tree. The definition point between a 3 and 4 is the opening of cam contact CFU. As soon as cam contact CFU breaks, relay RFU will drop out causing the tree network now to read out through the digit 4 circuit. This system prevents any ambiguity which might exist if two cams defined the end of one number and the start of the next.

In addition to its part in the above function, cam contact CDU and relay RDU serve an additional purpose. From Fig. 10 it can be seen cam contact CDU serves as the definition point between a 4 and a 5 and between 9 and 0. Its duration is therefore 180°. When cam contact CDU opens, the second function of the relay RDU is to instruct the next higher decade to change from one number to the next when the units decade changes from 9 to 0.

As the units shaft position reaches its "5" position, the cam contacts CBU and CCU remain closed, however, cam contact CDU is closed to energize its related relay RDU to transfer its related contacts. Under these conditions the relay tree energizes the relay coil R5U from the line 52 through the relay contacts RFU*a* normal, RDUa transferred, RBUa transferred, and RCUb transferred. During a 5 readout, the relay contacts RDUc and RDUd are connected in the tens decade and transfer for reasons to be hereinafter explained.

From the above it can be seen that a digital value may be read for each position of the shaft and that by properly proportioning or controlling the making and breaking of the four cam contacts and selecting the proper readout terminals under control of the various cams, one and only one readout can be obtained. In addition, only two of the four cam contacts need be designed for precise timing on the shaft. For example, cam contacts CBU and CCU can overlap into adjacent digit positions without interefering with the correct or accurate readout.

To summarize the operation of the first decade, we can say that it completes a circuit from a common wire to one and only one of ten readout wires corresponding to ten 36° increments of shaft angle. It also sends a signal through its relay RDU to the next higher order decade and this signal is on for all units shaft positions corresponding to numbers 5 through 9 and for no others.

The tens decade shown at the lower portion of Fig. 8 involves a relay tree having an arrangement identical to the units readout tree. However, in order to provide an accurate readout of the tens decade, six cams are provided.

There is one difference involved over the units decade due to the fact that the tens decade must be controlled in changing from one number to the next by the next lower decade so that the change will occur when the next lower decade changes from 9 to 0 or 0 to 9.

Figure 11:
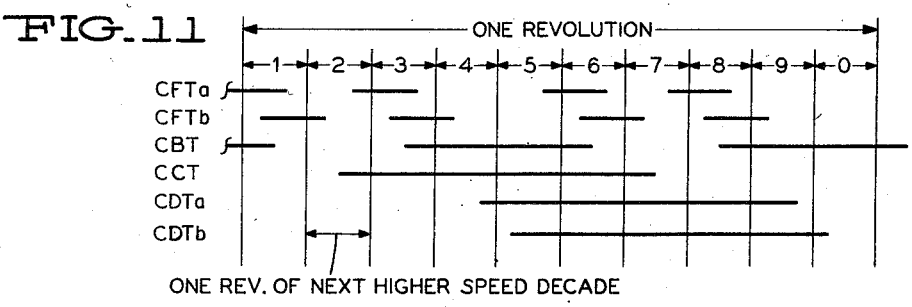

Referring to Fig. 11, it can be seen that for each revolution of the tens counter, the controlling cams are operated in a manner substantially identical to the units counter but at one-tenth the rate. Thus for example, one revolution of the units counter will advance the tens counter one tenth of a revolution. The operation of this tens counter is similar to that previously described with respect to Fig. 5 in that for each readout there can be one and only one readout terminal energized for each decade position.

As with the units decade, the difference between two adjacent numbers is defined by one change on either cam contact CFT a or b or cam contacts CDT a or b. It becomes necessary then to control only the changing of relays RFT and RDT by the next lower decade. This is accomplished in the following manner: Relays RFT and RDT are each controlled by two pairs of contacts CFTa, CFTb and CDTa, CDTb, respectively, and relay points RDUd and RDUc, respectively, on the relay RDU of the next lower decade. It is to be noted that cam contacts CFTa and CDTa are always made at the beginning of their respective index lines and never at the ending. The other cam contacts CFTb and CDTb are always made at the ending of their respective index lines but never at the beginning. There is always some overlap between the related "a" and "b" cams near the center of each number. These pairs of tens cam contacts provide a control for the relays RDT and RFT similar to the cam contacts CDU and CFU for the relays RDU and RFT in the units decade.

With each decade geared ten-to-one with respect to its next lower decade, the 180° relay RDU of the units decade which is picked from 5 through 9 appears as a signal 18° long to the tens decade, or in other words, as a signal which is made during the last half of each number in the tens decade. A contact on the relay RDU of the next lower decade controls which cam operated contacts "a" or "b" of the tens decade cams CDT and CFT are being read.

For example, consider the changing from a 2 to a 3 to a 4 in the tens decade. A tens 2 is read out through the readout tree and from the terminal when none of the relays are energized. At some time during 2 time, cam contact CCT closes, picking relay RCT but not changing the readout tree. At the mid-point of the 2, the cam contact CDU of the units closes, when units change from 4 to 5. This has no effect on the readout of the tens 2. During the last half of the 2 time, cam contact CFTa closes, but relay RFT will not be energized because relay RDU of the units has been picked. At the time the units change from 9 to 0, the relay RDU drops, completing a circuit through cam contacts CFTa and RDUd to relay RFT and thus switch the readout tree from terminal 2 to terminal 3.

During the first half of tens digit 3, cam contact CFTb will close. At the center of the 3, the units relay RDU will be energized, causing relay RFT to remain picked through contact RDUd transferred, and cam contact CFTb. As the units decade changes from 9 to 0, the units relay RDU will drop out, opening the circuit leading to the relay RFT at the cam contact CFTb. Thus relay RFT will be de-energized because at this time cam contact CFTa has been opened. This action switches energization of the relay tree from terminal 3 to terminal 4 because some time during 3 time cam contact CBT closed to energize relay RBT.

Assuming the shaft is in position 24, the units 4 terminal is energized, as previously described, and the tens 2 terminal is energized through the normal contacts RFTa, RDTa and RBTb. Some time after the tens shaft enters the "2" position, the cam contact CCT closes and relay RCT transfers, however, the contacts RDUc are normal so that the relay RDT remains normal to continue the digit 2 readout. As the units counter reaches its digit 5 position, relay RDU energizes and transfers its related a, b, c and d contacts. This transfer of contacts RDUc and RDUd has no effect on the associated relays RDT and RFT because their respective cam contacts are open. Shortly after this contact transfer occurs, cam contact CDTa closes. While cam CCT causes transfer of the coil RCT, this does not effect the 2 readout and the transferred contact RDUd does not permit energization of the relay RDT.

As the units decade passes through 9 to 0, the units relay RDU returns to normal. At this time the relay RFT is energized to read out a 3 from the tens decade. This readout takes place from the line 52 through contacts RFTa transferred, RDTb normal and RCTd transferred.

Thus as in the previous embodiment, the operation of the units decade directly effects the operation of the tens decade through its related RDU contacts. In this manner a positive readout is accomplished in the tens decade. Likewise, the operation of the relay RDT, during its latter half of operation, is effective to control the next higher order or hundreds decade in a manner identical to the relay RDU on the tens decade, except for a factor of 10 in input shaft rotation.

The operation of the third and higher order decades is exactly the same as the operation of the second decade. In each case a 0 through 4 or 5 through 9 input selecting signal is obtained from the immediately preceding lower order unit and an output selecting signal analogous to the relay RDT signal in the second decade is sent on to the next higher order unit.

If it is permissible for the negative numbers to appear in complement form, i. e., −001 is indicated by 999, −123 by 877, etc., then the circuits just explained for positive numbers will work correctly on negative numbers also. A 3 decade counter, for example, will indicate 002, 001, 000, 999, 998, etc., as it is turned through decreasing numbers near zero.

It will appear obvious from the above that while the units decade does not include an odd or even relay, there is disclosed an arrangement whereby the contacts are made and broken consecutively from one readout position to the next to provide the positive one and only one readout.

Figure 4:
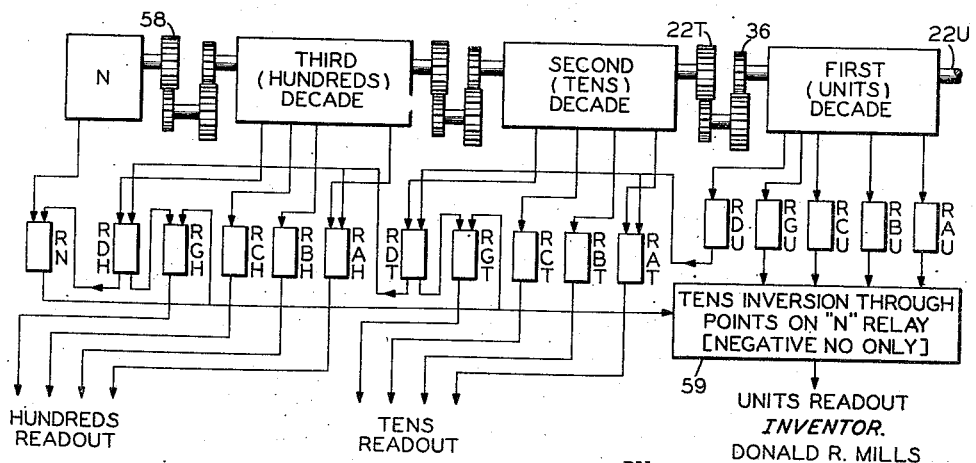
Fig. 4 is a diagrammatic view of a 3-denomination counter embodying the invention arranged for positive and negative numbers.

If it is desired that negative numbers be given in true form accompanied by a minus sign, the necessary relay circuits for a 3 decade counter are shown in Figs. 4 and 9.

The cam controlled contacts operated by the gears 58 on the end of the third decade, together with the relay RDH controlled by the third decade, cause the relay RN to be operated for all negative numbers and for no positive numbers.

As a first approximation, negative numbers in complement form can be changed to true form by taking the nines complement of each decade output. However, the result is always one unit too positive, for example, 877 would invert to —122 instead of the correct value —123. Therefore, this requires that the tens complement be taken of the first decade output wires instead of the nines complement. In addition, the D signal of the units decade sent to the second decade must also be rotated properly. This is accomplished by providing a second rotated control cam contact CGU to operate the relay RGU on negative numbers.

As shown, the relay RN includes contacts to provide a direct nines complement in the hundreds and tens relay network. While the units network gives a true readout, any values readout during negative number operations are tens complemented in a standard complementing relay network 59, Fig. 4. In this instance, the relay network would be operated by the negative relay RN.

The cam timing and wiring diagrams for negative number systems are shown in Figs. 9, 12 and 13. The circuits for negative number readout are essentially the same as for positive numbers, while the readout relay tree or network is the same.

In Fig. 9 there is disclosed an arrangement which is substantially identical to that shown in Fig. 8 with the exception that a means for negative readout is provided. In describing this arrangement, the units decade will be considered first.

There has been added to the circuit an additional relay RGU. This relay is under control of a contact on the relay RN which makes it operative in a manner different from the parallel connected relay RDU for negative numbers only. This additional relay is controlled by an additional cam contact CGU which is displaced from the cam contact CDU by 36°. The relay RFU of the units decade includes a contact RFUb which also controls the relay RGU so that only one cam change will determine the difference between any two adjacent numbers. In this arrangement, the relay RDU controls the relay tree readout for the units decade while the parallel relay RGU controls the tens decade. The tens complement is taken of the units decade by eight points, not shown, on the negative number relay RN.

The above circuit modification does not affect the operation of the tens decade during positive readout. In series with the relay RGU are transfer contacts RNa and RFUb under the control of the relays RN and RFU, respectively. These contacts are selectively operative to shift operation of the relay RGU from the 5 to 9 shaft position to the 6 to 0 shaft position during negative number readout. By referring to Fig. 12, it can be seen that although cam contact CGU is closed through the 0 shaft position, it cannot complete the circuit to the relay RGU during positive readout because relay contact RNa is normal. The energization of the relay RDT is accomplished by transfer of the contacts RGTa, which causes the relay RDT to operate in a manner identical to relay RDU when the decade is between its 5 and 9 position for positive numbers. During negative readout, the relay RGT is energized from 0 to 4 of the tens shaft position to provide a nines complement of the shaft position at the readout terminals. The relay RGT also includes operating contacts extending to the next higher order or hundreds decade which controls identical relays therein for the same operation.

Considering next the tens and higher decades, the additional relay RDT controls the readout tree or network only. The relay RGT continues to serve the function of controlling the next higher decade. As mentioned previously, if the relay RDT contacts in the readout tree are transferred for any positive number, the nines complement is read out through the tree. It is in this manner that the nines complement is taken for the tens and higher decades. For negative numbers, the relay RDT operates when the relay RGT does not operate, and is not operated when the relay RGT is operated. This is accomplished by the combination of contacts shown controlling the relay RGT. For positive numbers the relays RGT and RDT operate together.

The relay RN requires eight contacts, not shown, to take the tens complement of the units decade and one contact for each decade including the units to control the RG relays. A contact, not shown, on the relay RN may also be used to indicate a plus or minus sign.

Fig. 13 discloses the cam contact operation of the tens and higher decades. If these are followed through for positive numbers, it will be found they operate in a manner identical to the previously-described modification.

Assuming now it is desired to provide an operation involving a negative readout, it is necessary, as previously mentioned, to provide a tens complement at 59, Fig. 4, from the units decade and a nines complement from all subsequent decades. This is readily accomplished by connecting the output from the units decade through a suitable complementing relay network to provide a tens complement and no change is required in the units output circuit. By operation of relay RGH, when the counter passes from positive to negative numbers, the negative number relay is operated. Operation of the relay RN transfers its contacts RNa and RNb and the transfer of the contact RNb is effective to reverse the normal operation of the relay RDT to energize the same through the contact RGTa normal from 0–4 and de-energize the relay during the 5 to 9 position of the shaft. Energization of this single relay in the tens decade will provide an automatic nines complement for the shaft position. Thus, for example, if the shaft position is such as to indicate a 1, the relay RDT will transfer its contact RDTb and raise the 8 terminal through the contacts RCTa normal and RFTa transferred. Each and every shaft position is complemented in this manner. It will be apparent that during the initial rotation of the tens shaft the relay RDT is energized to provide a nines complement for digits 1, 2, 3, 4, and 5. At 5 time the relay RDT is returned to normal to provide the nines complement for 6, 7, 8, 9, and 0.

At the 0 units position the relay RGU is under the direction of the contact RFUb and thus falls under the direct control of cam contact CGU. By referring to Fig. 12, it will be seen that the operation of relay RGU has been shifted to the 6 through the 0 position of the units decade. This shifting of the holding period for the relay RGU is provided to permit the proper readout of the tens complement and thus avoids ambiguity of readout of the tens and higher order decades when the units decade passes through its "0" position.

From the foregoing it can be seen that there has been provided an improved counter mechanism for indicating or recording shaft positions which are positive in action and from which one and only one readout occurs from each decade position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A device for indicating digital positions of a shaft comprising a plurality of cam contacts, the number of said cam contacts being less than the number of digital positions, to be indicated on said shaft, parallel digit circuits selectively prepared for readout by operation of said contacts, a plurality of cams having cam contact closing portions thereon secured to said shaft, one cam for each cam contact, the cam contact closing portions of certain of said cams overlapping into adjacent digital positions of said shaft to prepare digit position readouts over more than one of said parallel digit circuits, the cam contact closing portion of at least one of said cams being operative between predetermined digital positions of said shaft to close and open its related cam contact, and switch means disposed in some of said parallel digit circuits and associated with said last-named cam contact for completing one and only one of the prepared parallel digit circuits.

2. A device for indicating digital positions of a shaft comprising a plurality of cam contacts, the number of said cam contacts being less than the number of digital positions to be indicated on said shaft, parallel digit circuits selectively prepared for readout by operation of said cam contacts, a plurality of cams having cam contact closing portions secured to said shaft, one for each shaft, the cam contact closing portions of certain of said cams overlapping into adjacent digital positions of said shaft to prepare digit readouts over more than one of said parallel digit circuits, at least one of said cams defining a timing cam having cam contact closing portions operative between predetermined digital positions of said shaft to close and open its related cam contact to define a timing contact, and switch means disposed in said parallel digit circuits, said switch means being operated by said timing contact for selectively closing and opening said parallel digit circuits, said timing contact alternately operating said switch means between the prepared parallel digit circuits to provide a readout over one and only one of said parallel digit circuits.

3. A readout device for indicating different digital positions of a shaft comprising parallel digit readout circuits, one for each digital position of said shaft, a plurality of relays having contacts selectively connected in said parallel digit readout circuits to prepare one or more of the same for readout in accordance with a predetermined sequence of operation, a separate cam contact for completing a circuit to selectively operate with each relay, and an individual cam for operating each cam contact, two of said cams being operative to open or close their related cam contacts between predetermined digital shaft positions and the remaining cams having cam contact closing portions overlapping into adjacent digital positions of said shaft, said cams having the overlapping cam contact closing portions being operative to prepare a plurality of the parallel digit readout circuits for readout in a preselected manner, said two of said cam contacts operating their related relays to select the proper digit circuit of the prepared parallel digit readout circuits to provide one and only one digital readout.

4. In a device for indicating different digital positions of a shaft, digit cams on said shaft, digit contacts operated by the respective digit cams, parallel digit readout circuits prepared by said digit contacts, switching means for completing the digit circuits between adjacent digital positions of the shaft, and a cam contact operated at alternate digital positions of said shaft for operating said switching means to provide one and only one digit readout circuit for each shaft position regardless of the number of parallel digit readout circuits prepared for readout by said digit contacts.

5. In a device for indicating different digital positions of a shaft, a group of parallel digit circuits, each of said circuits including circuit closing means operative at specific digital positions of the shaft to prepare the related circuit for readout and at least some of said circuit closing means being operative beyond specific digital positions of the shaft, and shaft position circuit closing means operative in parallel with said circuit closing means when the shaft passes from one digital position to the next to close one and only one of the parallel digit circuits for each digit position.

6. A device as claimed in claim 5 wherein said shaft position circuit closing means includes switch means operative in unison for all of said parallel digital circuits at alternate digital positions of said shaft to provide the transfer from one digital position to the next.

7. A device as claimed in claim 5 wherein certain of said parallel digit circuits comprise two branch circuits, the circuit closing means for each of said certain specific parallel digit circuits corresponding to positions of the shaft comprising two circuit closing devices, one in each branch circuit of the related circuit, said shaft having thereon a cam for operating each circuit closing device, the cams associated with each digital position of the shaft being overlapped with each other and with the cams associated with adjacent digital positions of the shaft.

8. A multi-order counter for indicating the digital position of a shaft comprising a group of single order counters each having a shaft, the shafts each being provided with speed reduction therebetween conforming to a predetermined system of notation, digit cams on each shaft, digit contacts operated by respective digit cams, parallel digit readout circuits prepared by respective digit cams in each order, circuit control means in the higher order parallel digit readout circuits controlled by a lower order shaft, a cam on said lower order shaft, and cam contact means operated by said last-named cam for operating said higher order circuit control means for one half of each revolution of said lower order shaft to provide a positive transfer from one digital position to the next in the next higher order.

9. A multi-order counter as claimed in claim 8, wherein said circuit control means includes relay contacts, a coil operated relay for operating said relay contacts, the coil of said relay being in a circuit controlled by said cam contact on the lower order shaft, said coil operated relay including additional contacts disposed in certain of said parallel digit circuits in said lower order to selectively transfer the parallel digit readout circuits from the lower to the higher values.

10. A multi-order counter for indicating the digital position of a shaft comprising a group of single order counters each having a shaft, the shafts being connected together to provide a speed reduction therebetween conforming to a predetermined system of notation, digit cams on each shaft, the number of digit cams being less than the number of digit divisions of said shaft, digit contacts operated by the related digit cams, parallel digit readout circuits selectively prepared by the digit contacts, circuit control means in the higher order parallel digit readout circuits controlled by a cam contact operated by the lower order shaft, and circuit control means in the lower order parallel digit readout circuits controlled by the digit contacts operated by the lower shaft, said cam contact being operative to simultaneously switch parallel digit readout circuits in adjacent orders.

11. In a counter having a shaft whose positions are to be indicated in digital increments, a number of terminals corresponding to the number of digital positions of the shaft, parallel digit circuits connecting with said terminals, a number of digit cams carried by said shaft, the number of digit cams being less than the number of terminals, switching means operated by said digit cams for preparing one or more of the parallel digit circuits leading to related terminals when said shaft is being rotated from one digit position to the next, and additional cam contact operating means for operating said additional switching means to transfer the readout from one of the parallel digit circuits to another of the parallel digit circuits when the shaft is rotated from one digital position to the next, said additional switching means being alternately operative between at least some of the adjacent digital positions of said shaft.

12. In a counter having a shaft whose circumference is substantially equally divided to indicate digital increment positions 0 through 9, a number of cams on said shaft, the number of cams being less than the number of digital increments, some of said cams having lobe portions circumferentially extending beyond that assigned to the digital increment positions on said shaft; a plurality of digit position contacts, one for each cam, said digit position contacts being closed by said lobe portions in a predetermined sequence and whereat more than one of said digit position contacts may be closed during simultaneous portions of the shaft rotation; digit terminals, one for each digit 0 through 9; a digit circuit connected to each digit terminal, said digit circuits defining a plurality of parallel connected circuits connected to said position contacts in a predetermined sequence a timing cam rotated in synchronism with said shaft; and switch means operated by said timing cam between alternate digit positions for differentiating between the closed digit position contacts to complete one and only one digit circuit to said digit terminals in accordance with the true shaft position.

13. A counter having a shaft whose circumference is substantially equally divided in order to indicate the rotational positions in digital increments 0 through 9, comprising a number of axially spaced cams on said shaft, said cams being provided with circumferentially extending lobe portions, the total number of cams being less than the total number of digital increments, at least some of said cams including a plurality of lobe portions located in accordance with different digital increment positions of the shaft, said lobe portions on at least some of said cams extending circumferentially beyond that assigned to the digital increment positions on the shaft; a plurality of digit position contacts, one for each cam, said digit position contacts being closed by the related lobe portions in a predetermined sequence and whereat more than one of said digit position contacts may be closed during simultaneous portions of the shaft rotation; digit terminals, one for each digit 0 through 9; parallel digit circuits connected to said digit terminals; switch means for connecting one or more of said digit terminals with said cams to divide said digit terminals in two groups having lower and higher orders, cam contact means operative in synchronism with said shaft for alternately connecting said last-named switch means to the lower and higher order digit terminals; a timing cam rotated in synchronism with said shaft; and timer cam-operated switch means associated with said digit circuits to alternately switch between adjacent digital increment shaft positions for differentiating between the closed digit position contacts and to complete the digit circuit to one and only one digit terminal in accordance with the true shaft position.

14. A counter for a shaft whose rotational position is to be indicated in digital increments, comprising a plurality of digit indicating readout terminals equal to the desired digital increment positions, a network of parallel digit lines defining readout circuits selectively connected one each to said digit terminals and to a common line, a plurality of relays having associated relay contacts selectively connected in said network of parallel digit lines to open and close the same, the number of relays being less than the number of digit terminals, a separate cam contact connected to each relay, and means including cams secured to said shaft and having contact closing portions for operating each cam contact in a preselected manner, the contact closing portions of a selected number of cams overlapping into adjacent digital incremental positions to operate the related relays and prepare the digit terminals for a plurality of digital readouts, the contact closing portions of the remaining cams being operative at definite digital incremental positions of said shaft to operate their related relays and associated relay contacts to differentiate between the remaining relay contacts and provide one and only one readout circuit to said digit terminals.

15. A multi-order counter for a shaft whose rotational positions are to be indicated in digital increments, comprising a group of digit terminals equal to the desired digital increment positions for each order, each group of terminals including a plurality of parallel digit circuits formed in a network defining readout circuits and connected to a common line, a plurality of relays having associated relay contacts selectively connected in said network of parallel digit circuits to open and close the same, the number of relays being less than the number of digit terminals, a separate cam contact connected to each relay, a cam for operating each cam contact, each cam having contact closing portions to operate said cam contacts, the contact closing portions of a select number of cams overlapping into adjacent digital incremental positions to operate the related relays and prepare the digit terminals for a plurality of possible digital readouts, the contact closing portions of the remaining cams being operative at definite digital incremental positions of said shaft to operate their related relays and associated relay contacts to complete one and only one readout circuit to one of said digit terminals in the group, and relay contacts operative by one of said relays in the lower order counter disposed in selected parallel digit circuits of the next higher order counter for switching the same to other parallel digit circuits of the some group at the end of each complete cycle of the lower order counter.

16. The combination as claimed in claim 16 wherein said one of said relays in the lower order counter is energized continuously for one half of the digit positions in the lower order counter, said relay contacts carried by said one of said relays disposed in portions of the parallel digit circuit in the next higher order and operative to define the transition from one digital position of the higher order shaft to the next digital position, said lower order counter making one complete revolution for each digital increment position advance of the next higher order.

17. In a multi-order counter for a reversible shaft whose rotational positions may be indicated in positive or negative digital increments comprising a plurality of counters having lower order and higher order shafts connected through a speed reduction mechanism, a group of digital readout terminals for each order, each group of terminals including a plurality of parallel digit lines formed in a network defining readout circuits, cams on each shaft, cam contacts operated by respective cams, said cam contacts being operative by the respective cams in each order to prepare a plurality of the readout circuits, circuit control means in the higher order digit readout circuits controlled by the lower order counter, a cam on said lower order shaft, cam-operated contact means for switching portions of said higher order digit readout circuit for one half of each revolution of said lower order shaft to provide a positive transfer from one digital position to the next in the next higher order counter and to provide a digital readout from one and only one of the higher order digital readout terminals, and means operative as said shaft passes through its 0 position when rotated in the negative direction for complementing the shaft position digital readout circuits to provide a direct complemented readout.

18. In a multi-order counter for a shaft whose rotatable positions may be indicated in positive or negative digital increments comprising a plurality of counters having lower order and higher order shafts connected through a speed reduction mechanism, a group of digital readout terminals for each order, each group of digital readout terminals including a plurality of parallel digit lines formed in a network defining readout circuits to a common line, a plurality of relays having associated relay contacts selectively connected in said network of each group, the number of relays being less than the number of digital readout terminals, a cam contact connected to each relay, cams having contact closing portions for operating each cam contact, the cam contact closing portions of a select number of cams overlapping into adjacent digital positions of said shaft to operate related relays and prepare the digital readout terminals for a plurality of digital readout circuits, the contact closing portions of the remaining cam operating between definite digital increment shaft positions to control a related relay and associated relay contacts to differentiate between the readout circuits prepared by the remaining relay contacts and provide one and only one digital readout circuit to the connected digital output terminals, one of said relays being operated for one continuous group of digital positions in the lower order counter to selectively switch the parallel digit readout circuits to the lower and upper digit values 0–4 and 5–9, respectively, a half shaft revolution relay parallel connected with said last-named relay in said lower order counter for controlling the energization of one of said relays in said higher order counter to provide the digital switching from one digit to the next adjacent digit for each revolution of the lower order counter in the positive direction, relay-operated switch means operative when said shaft is rotated through its 0 position in the negative direction for modifying the operation of said half shaft revolution relay to provide a complement readout for said higher order counter, and means carried in said lower order counter for modifying the time of operation of one of the relays in the higher order counter by shifting the lower order control one digit position to provide the proper higher order digital readout as said lower order counter completes a revolution in the reverse direction.

References Cited in the file of this patent
UNITED STATES PATENTS

| | | |
|---|---|---|
| 2,191,567 | Hofgaard | Feb. 27, 1940 |
| 2,490,362 | Lake et al. | Dec. 6, 1949 |
| 2,496,585 | Harper | Feb. 7, 1950 |